(12) United States Patent
Mushegian et al.

(10) Patent No.: US 10,983,528 B2
(45) Date of Patent: Apr. 20, 2021

(54) SYSTEMS AND METHODS FOR ORIENTING A ROBOT IN A SPACE

(71) Applicant: Toyota Research Institute, Inc., Los Altos, CA (US)

(72) Inventors: Konstantine Mushegian, San Francisco, CA (US); Matthew Amacker, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 363 days.

(21) Appl. No.: 16/045,304

(22) Filed: Jul. 25, 2018

(65) Prior Publication Data

US 2020/0033879 A1    Jan. 30, 2020

(51) Int. Cl.
*G05D 1/02* (2020.01)
*G01C 3/06* (2006.01)
*A47L 9/28* (2006.01)

(52) U.S. Cl.
CPC .......... *G05D 1/0248* (2013.01); *A47L 9/2826* (2013.01); *A47L 9/2836* (2013.01); *A47L 9/2894* (2013.01); *G01C 3/06* (2013.01); *G05D 1/0225* (2013.01); *G05D 1/0234* (2013.01); *G05D 1/0276* (2013.01);
(Continued)

(58) Field of Classification Search
CPC .. B25J 11/0085; B25J 13/081; B25J 15/0019; B25J 15/103; B25J 5/007; B25J 9/046; G06Q 30/0255; H04L 41/0816; H04L 43/10; A47L 2201/04; A47L 11/206; A47L 11/24; A47L 11/4005; A47L 11/4011; A47L 11/4036; A47L 11/4061; A47L 15/006; A47L 15/4454; A47L 15/4463; A47L 2201/02; A47L 2201/022; A47L 9/2826; A47L 9/2836; A47L 9/2878; A47L 9/2894; B08B 1/002; B08B 1/008; B08B 1/04; B08B 2209/08; B08B 9/087; E03D 9/002; E03D 11/13; Y10S 901/15; Y10S 901/41; Y10S 901/46; A47K 17/00; G01S 15/931; G05D 1/0242; G05D 1/0255; G05D 2201/0203; H05B 47/19
See application file for complete search history.

(56) References Cited

U.S. PATENT DOCUMENTS 5,751,428 A * 5/1998 Kataoka ................ G03F 9/7026
356/401
7,480,958 B2    1/2009 Song et al.
7,634,336 B2    12/2009 Chae et al.
(Continued)

OTHER PUBLICATIONS

Yamamoto et al., Optical sensing for robot perception and localization, 2005, IEEE, pp. 14-17 (Year: 2005).*
(Continued)

*Primary Examiner* — Mcdieunel Marc
(74) *Attorney, Agent, or Firm* — Dinsmore & Shohl LLC

(57) ABSTRACT

An orientation system includes a base station comprising a light emitter that projects a pattern onto a projection surface of a space, an auxiliary station including an auxiliary emitter that projects an auxiliary pattern onto the projection surface, and a robot including a moveable base supporting an imaging device. The robot detects the pattern and the auxiliary pattern with the imaging device, and determines a location of the robot within the space based on the pattern.

20 Claims, 5 Drawing Sheets

(52) U.S. Cl.
CPC ..... *A47L 2201/022* (2013.01); *A47L 2201/04* (2013.01); *A47L 2201/06* (2013.01)

(56) References Cited

U.S. PATENT DOCUMENTS

| | | | |
|---|---|---|---|
| 8,780,342 | B2 | 7/2014 | Dibernardo et al. |
| 9,235,763 | B2* | 1/2016 | Joyce ................... G06K 9/0063 |
| 9,725,013 | B2 | 8/2017 | Romanov et al. |
| 9,921,586 | B2 | 3/2018 | Chiappetta |
| 10,322,804 | B2* | 6/2019 | Maekawa ............... G05D 1/042 |
| 2014/0031980 | A1 | 1/2014 | Gutmann et al. |
| 2016/0093124 | A1* | 3/2016 | Shi ....................... G05D 1/0016 |
| | | | 701/2 |
| 2016/0313736 | A1* | 10/2016 | Schultz ............... G06F 16/5838 |
| 2017/0185849 | A1* | 6/2017 | High ......................... G06K 9/66 |
| 2019/0055018 | A1* | 2/2019 | Bei ....................... B64C 39/024 |
| 2019/0096058 | A1* | 3/2019 | Fryshman ............ A01M 21/043 |
| 2020/0033874 | A1* | 1/2020 | Mushegian .......... G05D 1/0225 |
| 2020/0159252 | A1* | 5/2020 | Giuffrida ............... G01C 15/00 |
| 2020/0255143 | A1* | 8/2020 | Liang ................. H04N 5/23206 |

OTHER PUBLICATIONS

Robot Corporation patents intelligent navigation system for Roombas, http://www.ubergizmo.com/2010/09/robotcorporation-patents-intelligent-navigation-system-forroombas/, Sep. 30, 2010, 3 pages.
Optical sensing for robot perception and localization, htttps://pdfs.semanticscholar.org/1fb9/ab5b7186063bc10a09a6fffc15dd0810789c.pdf, May 11, 2018, 4 pages.

* cited by examiner

SYSTEMS AND METHODS FOR ORIENTING A ROBOT IN A SPACE

TECHNICAL FIELD

The present specification generally relates to autonomous robot movement and orientation and, more specifically, to systems and methods for using a pattern of beacons projected by a base station onto a projection surface of a space to orient a robot within the space.

BACKGROUND

Robots may determine their own location using one or more accelerometers, gyroscopes, and/or other motion detecting sensors. However, such sensors may be relatively expensive to implement and use. Additionally, using motion detecting sensors, the location of a robot may be tracked only with respect to an initially-calibrated location. Eventually, the motion detecting sensors must be recalibrated with respect to the reference location due to drift, environmental changes, and/or other sources of error.

A visual reference frame may provide a less expensive and constant way for the robot to determine its location. Because robots may operate in spaces with one or more projection surfaces (e.g., a ceiling, wall, etc.), a projection surface may provide a backdrop for providing a visual reference frame. However, most projection surfaces are uniform in color or texture and provide no identifying characteristics for which a robot may use to formulate a frame of reference. Moreover, any frame of reference installed or otherwise incorporated into the projection surface is not readily adaptable to the actions of the robot.

SUMMARY

In one embodiment, an orientation system includes a base station comprising a light emitter that projects a pattern onto a projection surface of a space, an auxiliary station including an auxiliary emitter that projects an auxiliary pattern onto the projection surface, and a robot including a moveable base supporting an imaging device. The robot detects the pattern and the auxiliary pattern with the imaging device, and determines a location of the robot within the space based on the pattern.

In another embodiment, a robot includes an imaging device and a control unit comprising a processor and a non-transitory, processor-readable storage medium storing a processor-readable instruction set. The processor-readable instruction set, when executed, causes the robot to capture an image of a projection surface of a space, detect a pattern and an auxiliary pattern in the image, and determine a location of the robot based on the pattern and a distance to the projection surface.

In yet another embodiment, a method of determining a location of a robot within a space including a projection surface with respect to a pattern and an auxiliary pattern, includes determining a distance from a base station to the projection surface of the space, projecting the pattern with the base station on the projection surface, projecting the auxiliary pattern with an auxiliary station on the projection surface, detecting the pattern with an imaging device positioned on the robot, determining a location of the robot based on an image of the pattern and the distance, detecting the auxiliary pattern with the imaging device, and determining a location of an object of interest based on the auxiliary pattern and the distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include systems and methods for locating, orienting, and/or moving an autonomous or semiautonomous robot within a space. An illustrative system may include a base station that projects a light pattern onto a projection surface of an operating area (e.g., a space, a room, a closed environment, etc.), which is then used by the autonomous or semiautonomous robot to orient the robot within the operating area. The system may further include the robot and/or one or more auxiliary stations positioned at or near one or more objects of interest within the operating area. The base station includes a distance finder for determining a distance from the base station to a projection surface (e.g., a ceiling) and a base light emitter. The base light emitter projects a pattern (e.g., a laser pattern) onto the projection surface. The robot includes a moveable base and an imaging device (e.g., a camera). The imaging device images the projection surface and detects the pattern on the projection surface to orient the robot within the operating area. The auxiliary station includes an auxiliary emitter. The auxiliary emitter projects an auxiliary pattern that is readable by the robot to determine a location of an object of interest.

Figure 1:
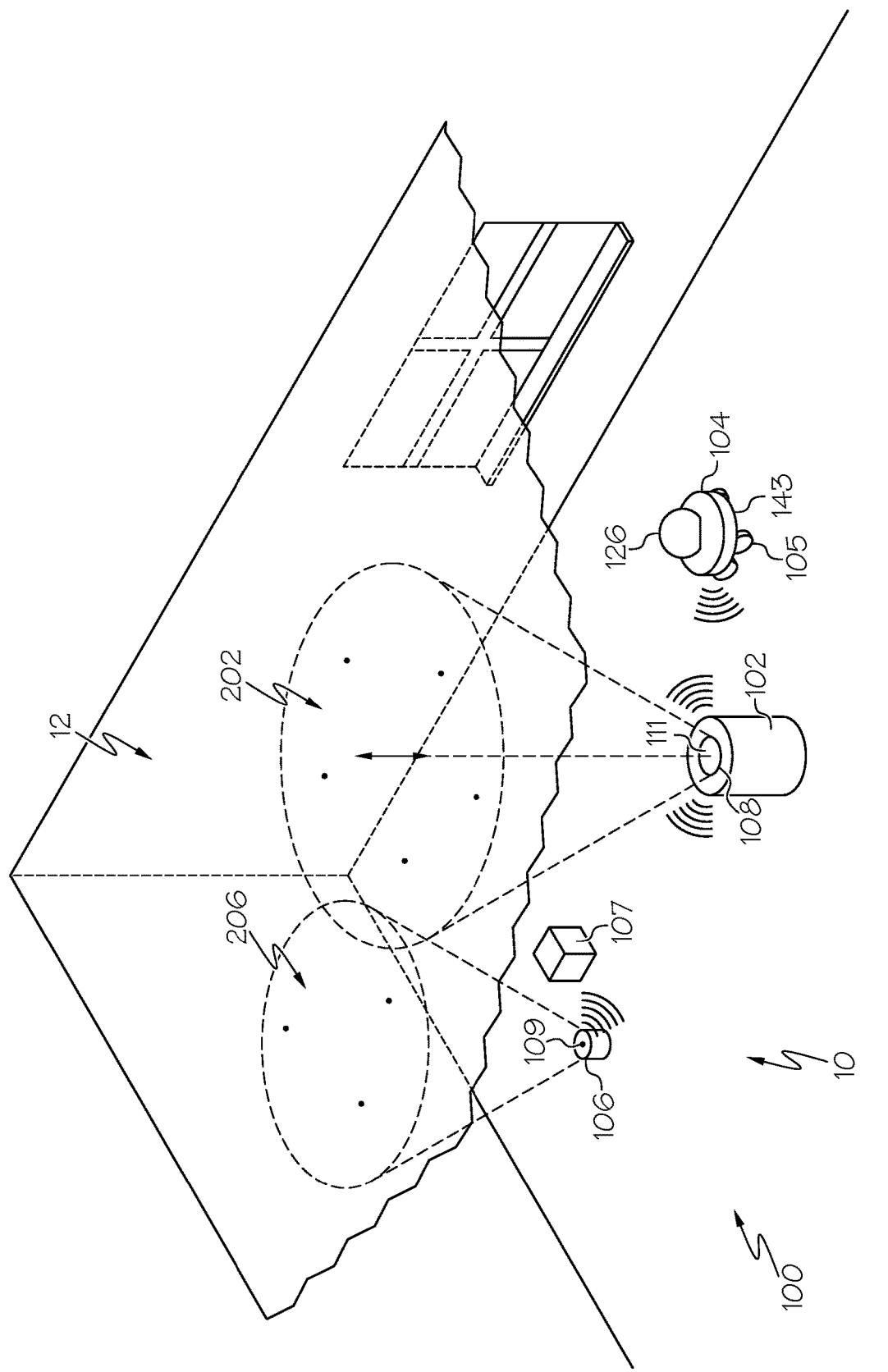
FIG. 1 depicts an illustrative system for orienting a robot within a space, according to one or more embodiments shown and described herein.

FIG. 1 depicts an illustrative orientation system 100 for orienting a robot 104. The orientation system 100 includes a base station 102, the robot 104, and/or one or more auxiliary stations 106. The base station 102 is generally a device that projects a pattern 202 onto a projection surface 12 of a space 10 in which the orientation system 100 is located. In the embodiment illustrated in FIG. 1, the projection surface 12 is a ceiling of the space 10, but is illustrated as a cut away transparent surface in FIG. 1 in order to show the contents of the space. The robot 104 may capture an image of the pattern 202 using an imaging device 126 coupled to the robot 104. The one or more auxiliary stations 106 may project an auxiliary pattern 206 onto the projection surface 12 of the space 10. In some embodiments, the pattern and the auxiliary pattern may be projected onto a different surface of the space 10 (e.g., a wall of the space 10). The auxiliary pattern 206 may be used, for example, to pass one or more auxiliary instructions to the robot 104 (e.g., to indicate the location of an object of interest 107 to the robot 104).

The robot 104, the base station 102, and the auxiliary station 106 are arranged on the floor of the space 10 in the particular embodiment depicted. However, it is contemplated that one or more of the robot 104, the base station 102, and the auxiliary station 106 may be on a surface above the floor (e.g., a coffee table, etc.). The robot 104 may maneuver around various objects in the space 10 as it interacts with the base station 102, the auxiliary station 106, and objects in the space 10, as described in greater detail herein.

Still referring to FIG. 1, the robot 104 may generally be any robot device, particularly mobile robot devices that can move about the space 10 autonomously or semiautonomously. As such, the robot 104 may include a moveable base 143 having a motorized wheel assembly 105 and/or an imaging device 126 coupled thereto. The motorized wheel assembly 105 may move the robot 104 within the space 10. In embodiments, the motorized wheel assembly 105 may be coupled to the moveable base 143 of the robot 104 such that the motorized wheel assembly 105, when actuated, causes the moveable base 143 to move. As such, the motorized wheel assembly 105 may include one or more motorized wheels driven by one or motors. In some embodiments, the motorized wheel assembly 105 may be communicatively coupled to one or more internal components of the robot 104 for the purposes of receiving commands for moving the robot 104, as described in greater detail herein. It should be understood that while the present disclosure generally relates to a motorized wheel assembly 105, other components and systems that can move the robot 104 around the space 10 are also contemplated and included within the scope of the present disclosure. For example, the robot 104 may include wings, rotors, propellers, continuous tracks, and/or the like.

Still referring to FIG. 1, the imaging device 126 may generally be any device having an array of sensors that detect light, particularly sensors that are configured to detect the pattern 202 and/or the auxiliary pattern 206. Illustrative sensors include, but are not limited to, sensors that detect radiation in an ultraviolet wavelength band, a visible light wavelength band, or an infrared wavelength band. The imaging device 126 may have any resolution. The imaging device 126 may be an omni-directional camera, a fish-eye camera, a panoramic camera, or the like. In some embodiments, one or more optical components, such as a mirror, fish-eye lens, or any other type of lens may be optically coupled to the imaging device 126. The imaging device 126 may be communicatively coupled to various internal components of the robot 104 for the purposes of transmitting image data, as described in greater detail herein.

In embodiments, the base station 102 may include at least a base light emitter 108 and/or a distance finder 111 in addition to other internal components described in greater detail herein. The base light emitter 108 may generally be any component or device that emits light, particularly a pattern of light. For example, the base light emitter 108 may include one or more laser emitting devices, one or more light emitting diodes (LEDs), one or more infrared light emitting devices, or the like. The base light emitter 108 may include a single component that emits light or a plurality of components that emit light. Such components may be movable and/or adjustable to change the pattern of light that is emitted in some embodiments. Accordingly, in some embodiments, the base light emitter 108 may include one or more devices or components for moving one or more elements that emit the projected pattern. In some embodiments, the base light emitter 108 may include one or more elements for altering the color of light (e.g., optical filters). In some embodiments, the base light emitter 108 may further include one or more devices or components for focusing the projected light into one or more shapes or patterns, such as lenses, mirrors, prisms, screens, and/or the like. In some embodiments, the base light emitter 108 may be configured to project a dynamic projection mapping (PM) or spatial augmented reality (AR) code by projecting computer-generated images onto an external surface. The computer generated images may be projected onto the projection surface 12 using a laser, LED, infrared projecting device, or some other device, for example, a DLP projector using a MEMS mirror. In some embodiments, the base light emitter 108 may tailor its emitted pattern to project a virtual 3D model onto the projection surface based on an image or scan of the projection surface that includes a mapped shape of the projection surface. In some embodiments, the emitted pattern may be a pattern of dots. For example, as shown in FIG. 1, the pattern of dots may be projected in a circular arrangement of 5 dots equally spaced apart (e.g., forming a pentagon shape) from directly underneath the pattern 202. As the pattern 202 is imaged from locations other than directly underneath the pattern 202, the pattern 202 may appear differently (e.g., the dots may be skewed). When the particular arrangement of the projected pattern is known, the location of the imaging device can be determined based on the shape of the differently-appearing pattern, as is described in greater detail herein. Patterns including objects other than dots may also be projected without departing from the scope of the present disclosure.

In one exemplary embodiment, the base station 102 may automatically calibrate the base light emitter 108 using a marker-based method in which, for example, the calibration of the interior orientation of the base light emitter 108 and the relative pose between the base light emitter 108 and the imaging device 126 (or an imaging device positioned on the base station 102 itself) may be calculated using a standard camera calibration algorithm. In some embodiments, the base station 102 may use one or more fiducial markers in the calibration of the base light emitter 108. For example, in some embodiments, a fiducial marker may be placed on the projection surface 12 of the space 10 to calibrate the base light emitter 108. In other embodiments, the location of the base station 102 within the room is used, along with the height of the ceiling and the angle of the light projected by the base light emitter 108, to determine the location of the markers in the pattern 202. In some embodiments, the location and pose of the imaging device 126, and thus the robot 104, is estimated based on comparing the known coordinates of the pattern 202 and the image coordinates of the projected pattern in image data captured by the imaging device 126. The image coordinate data and the known coordinate data may be compared in real time to track the location of the robot 104 with respect to the base station 102.

The distance finder 111 may generally be a component or device that measures a distance between the base station 102 and the projection surface 12. For example, the distance finder 111 may determine a distance from the base station 102 to the ceiling of a room. Illustrative components include, but are not limited to, a radar device, a sonar device, a LIDAR device, an ultrasonic device (e.g., a rangefinder), a light based measuring device (e.g., a device that incorporates time of flight sensors), radio-based measuring devices, or the like. The distance finder 111 may use any type of signal to determine a distance from the base station 102 to the projection surface 12. That is, the distance finder 111 may use radio signals, light signals, sound signals, and/or the like for determining a distance between the base station 102 and the surface. In some embodiments, the distance finder 111 may be integrated with the imaging device 126 for the purposes of determining a distance to the projection surface 12. That is, the base light emitter 108 may emit a baseline image, pattern, or the like that, when imaged by the imaging device 126, is determined to be a predetermined distance from the base station 102. When the base station 102 is located at a distance that is different from the predetermined distance, the image, pattern, or the like may be different from the baseline image, pattern, or the like. As such, the images captured by the imaging device 126 may be compared with baseline images to determine the distance to the projection surface 12 based upon a distance between points in a base pattern, a different size of points, a different pattern, and/or the like. In other embodiments, the distance finder 111 may operate by determining a distance between calibrated points on the surface. That is, the actual distance between two recognizable points (i.e., a reference distance, for example, the height of a window on a wall of the space 10) may be input to the base station 102, and the representative distance (e.g., a number of pixels) as determined by the distance finder 111 may be used to calculate the distance from the base station 102 to the surface. That is, based on the number of pixels from the bottom of the window to the top of the window in the image data and a known distance from the imaging device to the window, the distance finder 111 may be used to calibrate a distance between two or more known points. The distance (e.g., number of pixels) between these two or more known points may be used to calculate the distance between two or more other points (e.g., two or more of the dots in the pattern 202).

Similar to the base station 102, the auxiliary emitter 109 may also be configured to project an image or pattern, such as a pattern of dots, a dynamic projection mapping (PM) or spatial augmented reality (AR) pattern, by projecting computer-generated images onto an external surface. The computer generated images may be projected onto the external surface using a laser, LED, infrared projecting device, or some other device, for example, a DLP projector using a MEMS mirror. The robot 104 may image the auxiliary pattern 206 projected by the auxiliary emitter 109 to determine the location of the robot 104 with respect to the object of interest 107. In some embodiments, the robot 104 may image or scan the projection surface 12 using the imaging device 126 and/or the robot 104 may send image data to the base station 102 for the purposes of mapping the shape of the projection surface 12 and/or for measuring the distance to the projection surface 12, as described herein. The auxiliary emitter 108 may then tailor its emitted pattern to project a virtual 3D model onto the projection surface 12 based on the image or scan of the projection surface by the imaging device 126, as described herein.

In one exemplary embodiment, the auxiliary station 106 may automatically calibrate the auxiliary emitter 109 using a marker-based method in which, for example, the calibration of the interior orientation of the auxiliary emitter 109 and the relative pose between the auxiliary emitter 109 and the imaging device 126 (or an imaging device positioned on the base station 102 itself) may be calculated using a standard camera calibration algorithm. In some embodiments, the auxiliary station 106 may use one or more fiducial markers in the calibration of the auxiliary emitter 109. For example, in some embodiments, a fiducial marker may be placed on the projection surface 12 of the space 10 to calibrate the auxiliary emitter 109. In other embodiments, the location of the auxiliary station 106 within the room is used, along with the height of the ceiling and the angle of the light projected by the base light emitter 108, to determine the location of the markers in the auxiliary pattern 206. In some embodiments, the location and pose of the imaging device 126, and thus the robot 104, is estimated based on comparing the known coordinates of the auxiliary pattern 206 and the image coordinates of the auxiliary pattern 206 in image data captured by the imaging device 126. The image coordinate data and the known coordinate data may be compared in real time to track the location of the robot 104 with respect to the auxiliary station 106.

Figure 2:
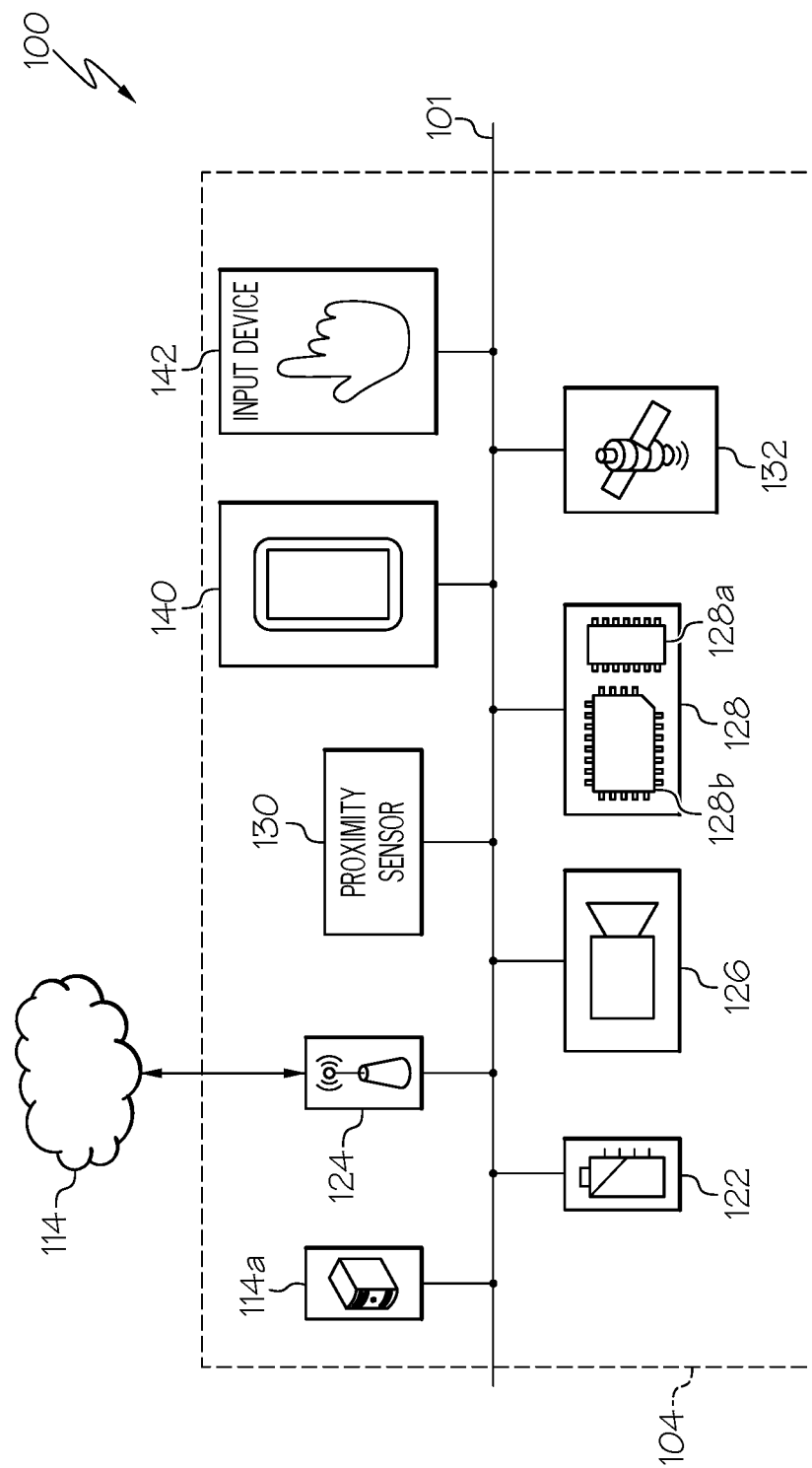
FIG. 2 depicts a schematic diagram of illustrative internal components of a robot, according to one or more embodiments shown and described herein.

Referring now to FIG. 2, illustrative internal components of the robot 104 are depicted. The robot 104 may include, for example, a robot battery module 122, a robot communications module 124, a robot ECU 128 including a robot processor 128a and a non-transitory processor-readable storage medium 128b, an input device 142, a display 140, the imaging device 126, a proximity sensor 130, and a location sensor 132. In some embodiments, the robot 104 may further include a storage device 114a that stores data obtained by the robot 104 (e.g., image data, saved information regarding baseline images, map information, etc.) and/or a non-transitory processor-readable instruction set. The storage device 114a may be coupled to the robot 104 through the network 114 (e.g., a remote server), but it is to be understood that in some embodiments, the storage device 114a may be a component of the robot 104 (e.g., a hard drive, a solid state drive, memory, or the like). In some embodiments, the various components of the robot 104 may be communicatively coupled to one another via a communication path 101.

The communication path 101 may be formed from any medium that is capable of transmitting a signal such as, for example, conductive wires, conductive traces, optical waveguides, or the like. The communication path 101 may also refer to the expanse in which electromagnetic radiation and their corresponding electromagnetic waves traverse. Moreover, the communication path 101 may be formed from a combination of mediums capable of transmitting signals. In one embodiment, the communication path 101 includes a combination of conductive traces, conductive wires, connectors, and buses that cooperate to permit the transmission of electrical data signals to components such as processors, memories, sensors, input devices, output devices, and communication devices. Accordingly, the communication path 101 may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

In some embodiments, the robot battery module 122 may be electrically coupled to the various electrical components of the robot 104 (not shown in FIG. 2) and/or may be communicatively coupled to various components of the robot 104. The robot battery module 122 may include a battery that may be any device capable of storing electric energy for later use by the robot 104 and/or components thereof. In some embodiments, the robot battery module 122 includes a rechargeable battery, such as a lithium-ion battery or a nickel-cadmium battery. In embodiments in which the robot battery module 122 includes a rechargeable battery, the robot 104 may include a charging port, which may be used to charge the robot battery module 122. Some embodiments may not include a charging port, such as embodiments in which the apparatus utilizes disposable batteries for power. It should be understood that the robot battery module 122 is merely illustrative, and any component that stores and provides an electrical charge to the various electrical components of the robot 104 is contemplated. In some embodiments, the robot battery module 122 may cause the battery charge level or status to be shown on display 140 based on data sent from the robot battery module 122.

The robot communications module 124 may generally be a device or component that couples the robot 104 to an external network such as the network 114. The robot communications module 124 may include any device or devices capable of transmitting and/or receiving data via the network 114. Accordingly, the robot communications module 124 can include a communication transceiver for sending and/or receiving any wired or wireless communication. For example, the robot communications module may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the robot communications module 124 includes hardware configured to operate in accordance with the Bluetooth wireless communication protocol. In another embodiment, the robot communications module 124 may include a Bluetooth send/receive module for sending and receiving Bluetooth communications to/from the communication path 101 and/or the network 114.

The robot ECU 128 may be any device or combination of components comprising one or more processors and one or more non-transitory processor-readable storage mediums, such as the robot processor 128a and non-transitory processor-readable storage medium 128b. The robot ECU 128 may include any device capable of executing one or more machine-readable instruction sets stored in any non-transitory processor-readable storage medium (e.g., the non-transitory processor-readable storage medium 128b). Accordingly, the robot ECU 128 may include an electric controller, an integrated circuit, a microchip, a computer, or any other computing device. While the robot ECU 128 depicted in FIG. 2 includes a single robot processor 128a, other embodiments may include more than one processor.

The non-transitory processor-readable storage medium 128b of the robot ECU 128 may include RAM, ROM, flash memories, hard drives, or any non-transitory memory device capable of storing machine-readable instructions and/or data such that the machine-readable instructions can be accessed and executed. The machine-readable instruction set may include logic or algorithm(s) written in any programming language of any generation (e.g., 1GL, 2GL, 3GL, 4GL, or 5GL) such as, for example, machine language that may be directly executed by the robot ECU 128, or assembly language, object-oriented programming (OOP), scripting languages, microcode, etc., that may be compiled or assembled into machine readable instructions and stored in the non-transitory processor-readable storage medium. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. In some embodiments, the non-transitory processor-readable storage medium 128b may include one or more algorithms for determining a location of the robot 104. For example, algorithms that compare a base image to an image captured by the imaging device 126 to determine a location of the robot 104. In some embodiments, the robot 104 may store one or more object recognition or classification algorithms (e.g., a scale-invariant feature transform ("SIFT") algorithm) in the non-transitory processor-readable storage medium 128b. In some embodiments, the non-transitory processor-readable storage medium 128b may include one or more algorithms for comparing a detected pattern and obtaining supplemental image data corresponding to estimated properties of the pattern from a supplemental image collection (e.g., the Internet). While the embodiment depicted in FIG. 2 includes a robot ECU 128 with a single non-transitory processor-readable storage medium, other embodiments may include more than one memory module.

The storage device 114a may generally be a storage medium that may contain one or more data repositories for storing data. The storage device 114a may be any physical storage medium, including, but not limited to, a hard disk drive (HDD), memory, removable storage, and/or the like. While the storage device 114a is depicted as a local device, it should be understood that the storage device 114a may be a remote storage device, such as, for example, a server computing device or the like.

The proximity sensor 130 may generally be any device or component capable of detecting the presence of nearby objects and transmitting a proximity signal indicative of a relative proximity of the robot 104 to the nearby objects. In some embodiments, the proximity sensor 130 may include a laser scanner, a capacitive displacement sensor, a Doppler Effect sensor, an eddy-current sensor, an ultrasonic sensor, a magnetic sensor, a radar device, a LIDAR device, a sonar device, or the like. Some embodiments may not include the proximity sensor 130, such as embodiments in which the proximity of the robot 104 to an object is determined from inputs provided by other sensors (e.g., the imaging device 126) or embodiments where a proximity of the robot 104 to an object is not needed. In some embodiments, the proximity sensor 130 may be used as a backup to other sensors for determining the location of the robot 104 based on the proximity to other objects with a known or reference location. In some embodiments, the proximity sensor 130 may include an RFID reader for reading an RFID tag. Correspondingly, the proximity sensor 130 may detect an RFID tag that may be installed in, on, or near an object of interest. For example, briefly referring to FIG. 1, an RFID tag may be placed in the auxiliary station 106 and/or near, in, or on the object of interest 107 and may be configured to emit an RFID tag signal. The proximity sensor 130 may be configured to include an RFID tag reader. Accordingly, the robot 104 may determine its proximity to the object of interest based on a reading of the RFID signal when the robot 104 is within range of the emitted RFID tag signal.

Referring again to FIG. 2, the location sensor 132 may generally be any device or component capable of sensing a location of the robot 104 and transmitting one or more signals indicative of the location. In some embodiments, the location sensor 132 includes a global positioning system (GPS) sensor, though embodiments are not limited thereto. Some embodiments may not include the location sensor 132, such as embodiments in which the location is determined in other ways (e.g., based on information received from the imaging device 126, the proximity sensor 130, or the like). In some embodiments, the location sensor 132 may be configured as a wireless signal sensor capable of triangulating a location of the robot 104 and/or one or more users or objects of interest by way of wireless signals received from one or more wireless signal antennas. In some embodiments, the location sensor 132 may be used as a backup to the imaging device 126 as a backup sensor for determining the location of the robot 104. In other embodiments, the location sensor 132 may be used as a verification or redundant check of the location of the robot 104, in addition to determining the location of the robot 104 with respect to the pattern using the imaging device 126 as described herein.

The imaging device 126 may be communicatively coupled to the robot 104 and thus may be communicatively coupled to the communication path 101 and to one or more processors (e.g., the robot ECU 128). Since the imaging device 126 is coupled to the robot ECU 128, data captured by the imaging device 126 may be shared with one or more components of the robot 104 and/or the orientation system 100 (e.g., the base station 102, the auxiliary station 106, etc.). For example, the robot 104 may send image data to the base station 102 via a wireless connection between the robot 104 and the base station 102.

In some embodiments, the display 140 may provide a visual output of the robot 104. For example, the display 140 may display a location of the base station 102, the robot 104, and/or the auxiliary station 106 on a map, and/or display one or more status images, controls, or communications interfaces related to the orientation system 100. The display 140 may include any medium capable of transmitting an optical output such as, for example, a cathode ray tube, light emitting diodes, a liquid crystal display, a plasma display, or the like. Moreover, the display 140 may be a touchscreen that, in addition to providing optical information, detects the presence and location of a tactile input upon a surface of or adjacent to the display 140. Accordingly, each display 140 may receive mechanical input directly upon the optical output provided by the display 140. Additionally, the display 140 may be the display 140 of a portable personal device such as a smart phone, tablet, laptop or other electronic device that is in connection with one or more of the base station 102, the robot 104, and the auxiliary station 106 via a connection, for example through the communication path 101 or over a network, such as the network 114. The display 140 may be integrated into a portion or portions of the robot 104 such that the display 140 is viewable and accessible to a user. Additionally, it is noted that the display 140 can include one or more processors and one or more non-transitory computer readable memories. While the illustrative embodiment of the robot 104 schematically depicted in FIG. 2 includes a display 140, the robot 104 may not include a display 140 in other embodiments.

The input device 142 may be coupled to the communication path 101 and communicatively coupled to the robot ECU 128. The input device 142 may be any device capable of transforming user contact into a data signal that can be transmitted over the communication path 101 such as, for example, a button, a lever, a switch, a knob, a touch sensitive interface, a microphone or the like. In some embodiments, the input device 142 includes a pressure sensor, a touch-sensitive region, a pressure strip, or the like. It should be understood that some embodiments may not include the input device 142 or may include a plurality of the input devices 142. In some embodiments, the input device 142 may be integrated with the display 140.

Figure 3:
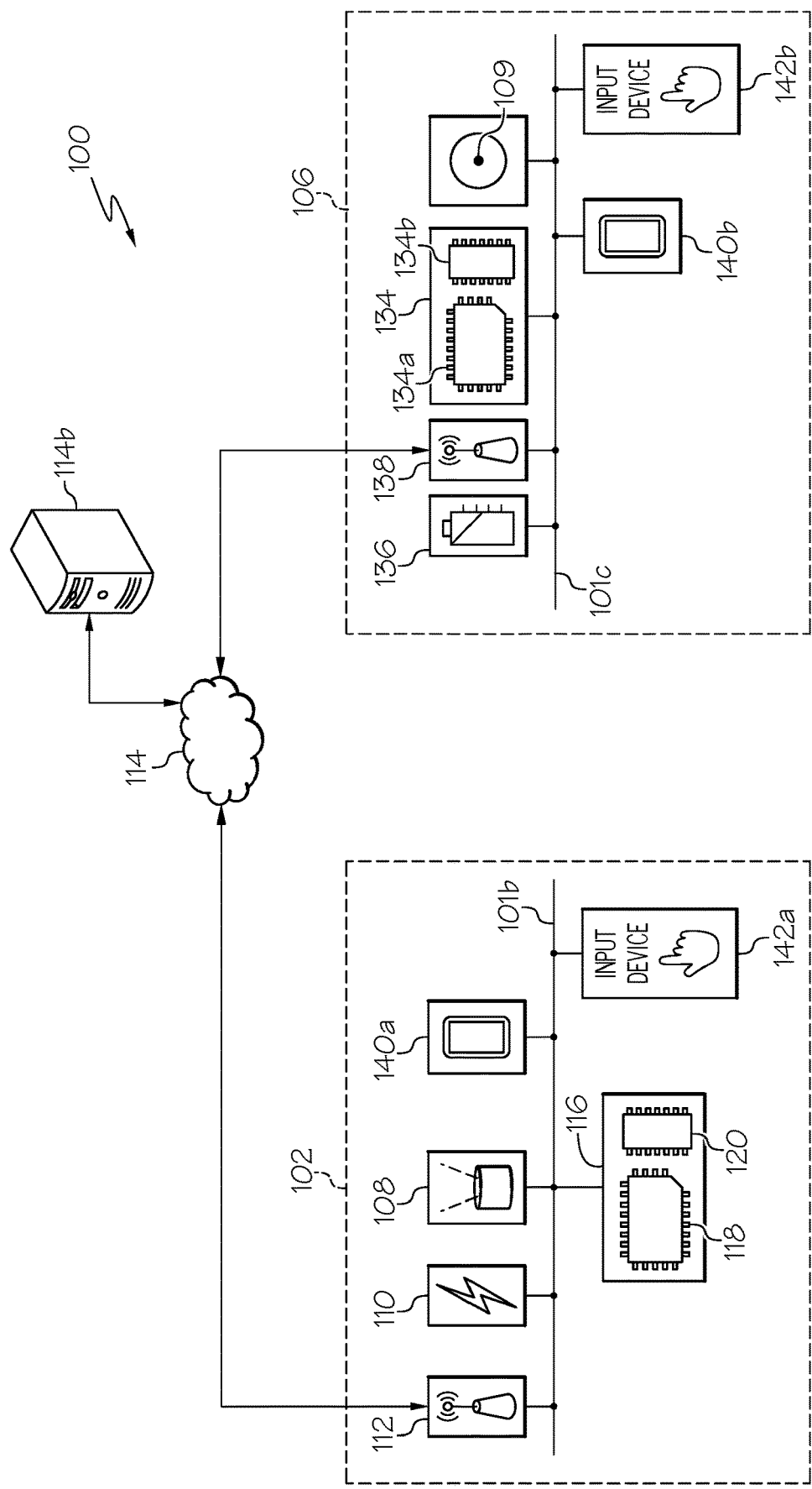
FIG. 3 depicts a schematic diagram of illustrative internal components of a base station and an auxiliary station, according to one or more embodiments shown and described herein.

FIG. 3 depicts a block diagram of illustrative internal components of the base station 102 and the auxiliary station 106. The base station 102 and the auxiliary station 106 may generally be communicatively coupled to one another via the network 114. The components of the base station 102 may be communicatively coupled via the communication path 101b and the components of the auxiliary station 106 may be communicatively coupled via the communication path 101c.

The base station 102 includes the base light emitter 108, the power module 110, and network interface hardware 112. The network interface hardware 112 may communicatively couple the base station 102 with a network 114, such as a cloud-based network. The base station 102 may include or be communicatively coupled to an electronic control unit, such as ECU 116, that includes a processor 118 and a non-transitory processor-readable storage medium 120. The base station may include a display 140a and/or an input device 142a.

The communication path 101b may be formed from any medium that is capable of transmitting a signal such as, for example, conductive wires, conductive traces, optical waveguides, or the like. The communication path 101b may also refer to the expanse in which electromagnetic radiation and their corresponding electromagnetic waves traverse. Moreover, the communication path 101b may be formed from a combination of mediums capable of transmitting signals. In one embodiment, the communication path 101b includes a combination of conductive traces, conductive wires, connectors, and buses that cooperate to permit the transmission of electrical data signals to components such as processors, memories, sensors, input devices, output devices, and communication devices. Accordingly, the communication path 101b may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 101b communicatively couples the various components of the orientation system 100. As used herein, the term "communicatively coupled" means that coupled components are capable of exchanging signals with one another such as, for example, electrical signals via conductive medium, electromagnetic signals via air, optical signals via optical waveguides, and the like.

The ECU 116 may be any device or combination of components comprising one or more processors, such as the processor 118 and non-transitory processor-readable storage medium 120. The processor 118 may be any device capable of executing one or more machine-readable instruction sets stored in the non-transitory processor-readable storage medium 120. Accordingly, the processor 118 may be an electric controller, an integrated circuit, a microchip, a computer, or any other computing device. The processor 118 is communicatively coupled to the other components of the orientation system 100 by the communication path 101b. Accordingly, the communication path 101b may communicatively couple any number of processors 118 with one another, and allow the components coupled to the communication path 101b to operate in a distributed computing environment. Specifically, each of the components may operate as a node that may send and/or receive data. While the embodiment depicted in FIG. 3 includes a single processor, the processor 118, other embodiments may include more than one processor.

The non-transitory processor-readable storage medium 120 is coupled to the communication path 101b and communicatively coupled to the processor 118. The non-transitory processor-readable storage medium 120 may include RAM, ROM, flash memories, hard drives, or any non-transitory memory device capable of storing machine-readable instructions such that the machine-readable instructions can be accessed and executed by the processor 118. The machine-readable instruction set may include logic or algorithm(s) written in any programming language of any generation (e.g., 1GL, 2GL, 3GL, 4GL, or 5GL) such as, for example, machine language that may be directly executed by the processor 118, or assembly language, object-oriented programming (OOP), scripting languages, microcode, etc., that may be compiled or assembled into machine readable instructions and stored in the non-transitory processor-readable storage medium 120. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 3 includes a base station 102 with a single non-transitory processor-readable storage medium, other embodiments may include more than one memory module.

The base station 102 may include a display, such as the display 140a, for providing visual output. For example, the display 140a may display a location of the base station 102, the robot 104, and/or the auxiliary station 106 and/or various statuses, controls, or communications related to the orientation system 100. The display 140a is coupled to the communication path 101b. Accordingly, the communication path 101b communicatively couples the display 140a to other modules of the orientation system 100. The display 140a may include any medium capable of transmitting an optical output such as, for example, a cathode ray tube, light emitting diodes, a liquid crystal display, a plasma display, or the like. Moreover, the display 140a may be a touchscreen that, in addition to providing optical information, detects the presence and location of a tactile input upon a surface of or adjacent to the display 140a. Accordingly, each display 140a may receive mechanical input directly upon the optical output provided by the display 140a. Additionally, the display 140a may be the display 140a of a portable personal device such as a smart phone, tablet, laptop or other electronic device that is in connection with one or more of the base station 102, the robot 104, and the auxiliary station 106 via a connection, for example through the communication path 101 or over a network, such as the network 114. The display 140a may be integrated into a portion or portions of the orientation system 100. The display 140a may be coupled to a handle or another portion of the orientation system 100 viewable and accessible to a user. Additionally, it is noted that the display 140a can include one or more processors and one or more non-transitory computer readable memories. In some embodiments, the base station 102 does not include the display 140a or any other type of display.

The input device 142a may be coupled to the communication path 101b and communicatively coupled to the processor 118. The input device 142a may be any device capable of transforming user contact into a data signal that can be transmitted over the communication path 101b such as, for example, a button, a lever, a switch, a knob, a touch sensitive interface, a microphone or the like. In some embodiments, the input device 142a includes a pressure sensor, a touch-sensitive region, a pressure strip, or the like. It should be understood that some embodiments may not include the input device 142a or may include a plurality of the input devices 142a.

The base station 102 may include the network interface hardware 112 which may couple to the communication path 101b and communicatively couple to the ECU 116. The network interface hardware 112 may be any device capable of transmitting and/or receiving data via the network 114. Accordingly, network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 112 includes hardware configured to operate in accordance with the Bluetooth wireless communication protocol. In another embodiment, network interface hardware 112 may include a Bluetooth send/receive module for sending and receiving Bluetooth communications to/from the network 114.

In some embodiments, one or more of the components coupled to the communication path 101b may be communicatively coupled to the network 114. In some embodiments, the network 114 is a personal area network that utilizes Bluetooth technology to communicatively couple the orientation system 100 with a robot control server system, a personal device of a user, or any other network connectable device. In other embodiments, the network 114 may include one or more computer networks (e.g., a personal area network, a local area network, or a wide area network), cellular networks, satellite networks and/or a global positioning system and combinations thereof. Accordingly, the orientation system 100 can be communicatively coupled to the network 114 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The base station 102 may include the power module 110. The power module 110 may include an AC or DC power source for supplying electric power to the base station 102 and/or one or more components thereof. In some embodiments, the power module 110 may plug into a wall socket, for example. In some embodiments, the power module 110 may include one or more batteries, such as a lithium ion battery or another type of chemical battery. In some embodiments, the power module 110 may supply electrical power to one or more external components, such as the robot 104 and/or the one or more auxiliary stations 106 when plugged into the power module 110.

The auxiliary station 106 may include an auxiliary ECU 134 that may include an auxiliary processor 134a and an auxiliary non-transitory processor-readable storage medium 134b, an auxiliary battery module 136, and an auxiliary wireless communications module 138. The auxiliary station 106 may include or be coupled to a display 140b and/or an input device 142b.

The auxiliary station 106 may include an auxiliary emitter 109. The auxiliary emitter 109 may include one or more lasers, LEDs, lights, infrared lights, or other visual indicators for projecting an auxiliary pattern of light or infrared light onto a surface, such as a ceiling or a wall of a room. The auxiliary emitter 109 may include one or more devices for focusing the projected light or infrared light into one or more shapes or patterns. The auxiliary emitter 109 may be charged by the power module 110 of the base station 102 or from some other source of electrical power, such as a standard 110 V outlet or a battery. In some embodiments, the auxiliary emitter 109 may include one or more devices for moving one or more elements of the projected pattern or projecting one or more shades or colors of light. The auxiliary emitter 109 may include one or more screens for screening light into one or more shapes.

The auxiliary ECU 134 may be any device or combination of components comprising one or more processors 134a and one or more auxiliary non-transitory processor-readable storage mediums 134b, similar to the ECU 116, such as the processor 118 and non-transitory processor-readable storage medium 120. The auxiliary ECU 134 may include any device capable of executing one or more machine-readable instruction sets stored in any non-transitory processor-readable storage medium. Accordingly, the auxiliary ECU 134 may include an electric controller, an integrated circuit, a microchip, a computer, or any other computing device. While the auxiliary ECU 134 depicted in FIG. 3 includes a single processor 134a and a single non-transitory processor-readable storage medium, other embodiments may include more than one processor.

The auxiliary non-transitory processor-readable storage medium 134b of the auxiliary ECU 134 may include RAM, ROM, flash memories, hard drives, or any non-transitory memory device capable of storing machine-readable instructions such that the machine-readable instructions can be accessed and executed. The machine-readable instruction set may include logic or algorithm(s) written in any programming language of any generation (e.g., 1GL, 2GL, 3GL, 4GL, or 5GL) such as, for example, machine language that may be directly executed by the auxiliary ECU 134, or assembly language, object-oriented programming (OOP), scripting languages, microcode, etc., that may be compiled or assembled into machine readable instructions and stored in the auxiliary non-transitory processor-readable storage medium 134b. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 3 includes auxiliary ECU 134 with a single auxiliary non-transitory processor-readable storage medium 134b, other embodiments may include more than one memory module.

The auxiliary battery module 136 may be electrically coupled to the various electrical components of the auxiliary station 106. The auxiliary battery module 136 may include a battery that may be any device capable of storing electric energy for later use by the auxiliary station 106. In some embodiments, the auxiliary battery module 136 includes a rechargeable battery, such as a lithium-ion battery or a nickel-cadmium battery. In embodiments in which the auxiliary battery module 136 includes a rechargeable battery, the auxiliary station 106 may include a charging port, which may be used to charge the auxiliary battery module 136. Some embodiments may not include the auxiliary battery module 136, such as embodiments in which the auxiliary station 106 is powered by the electrical grid, by solar energy, or by energy harvested from the environment. Some embodiments may not include a charging port, such as embodiments in which the apparatus utilizes disposable batteries for power.

The auxiliary wireless communications module 138 may couple the auxiliary station 106 to the communication path 101c and may communicatively couple the auxiliary station 106 to an external network such as the network 114. The auxiliary wireless communications module 138 may include any device or devices capable of transmitting and/or receiving data via the network 114. Accordingly, the auxiliary wireless communications module 138 can include a communication transceiver for sending and/or receiving any wired or wireless communication. For example, the auxiliary wireless communications module 138 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the auxiliary wireless communications module 138 includes hardware configured to operate in accordance with the Bluetooth wireless communication protocol. In another embodiment, auxiliary wireless communications module 138 may include a Bluetooth send/receive module for sending and receiving Bluetooth communications to/from the communication path 101c and/or the network 114.

The auxiliary station 106 may include a display, such as the display 140b, for providing visual output. For example, the display 140b may display a location of the base station 102, the robot 104, and/or the auxiliary station 106 and/or various statuses, controls, or communications related to the orientation system 100. The display 140b is coupled to the communication path 101b. Accordingly, the communication path 101b communicatively couples the display 140b to other modules of the orientation system 100. The display 140b may include any medium capable of transmitting an optical output such as, for example, a cathode ray tube, light emitting diodes, a liquid crystal display, a plasma display, or the like. Moreover, the display 140b may be a touchscreen that, in addition to providing optical information, detects the presence and location of a tactile input upon a surface of or adjacent to the display 140b. Accordingly, each display 140b may receive mechanical input directly upon the optical output provided by the display 140b. Additionally, the display 140b may be the display 140b of a portable personal device such as a smart phone, tablet, laptop or other electronic device that is in connection with one or more of the base station 102, the robot 104, and the auxiliary station 106 via a connection, for example through the communication path 101 or over a network, such as the network 114. The display 140*b* may be integrated into a portion or portions of the orientation system 100. The display 140*b* may be coupled to a handle or another portion of the orientation system 100 viewable and accessible to a user. Additionally, it is noted that the display 140*b* can include one or more processors and one or more non-transitory computer readable memories. In some embodiments, the base station 102 does not include the display 140*b* or any other type of display.

The input device 142*b* may be coupled to the communication path 101*b* and communicatively coupled to the processor 118. The input device 142*b* may be any device capable of transforming user contact into a data signal that can be transmitted over the communication path 101*b* such as, for example, a button, a lever, a switch, a knob, a touch sensitive interface, a microphone or the like. In some embodiments, the input device 142*b* includes a pressure sensor, a touch-sensitive region, a pressure strip, or the like. It should be understood that some embodiments may not include the input device 142*b* or may include a plurality of the input devices 142*b*.

Figure 4:
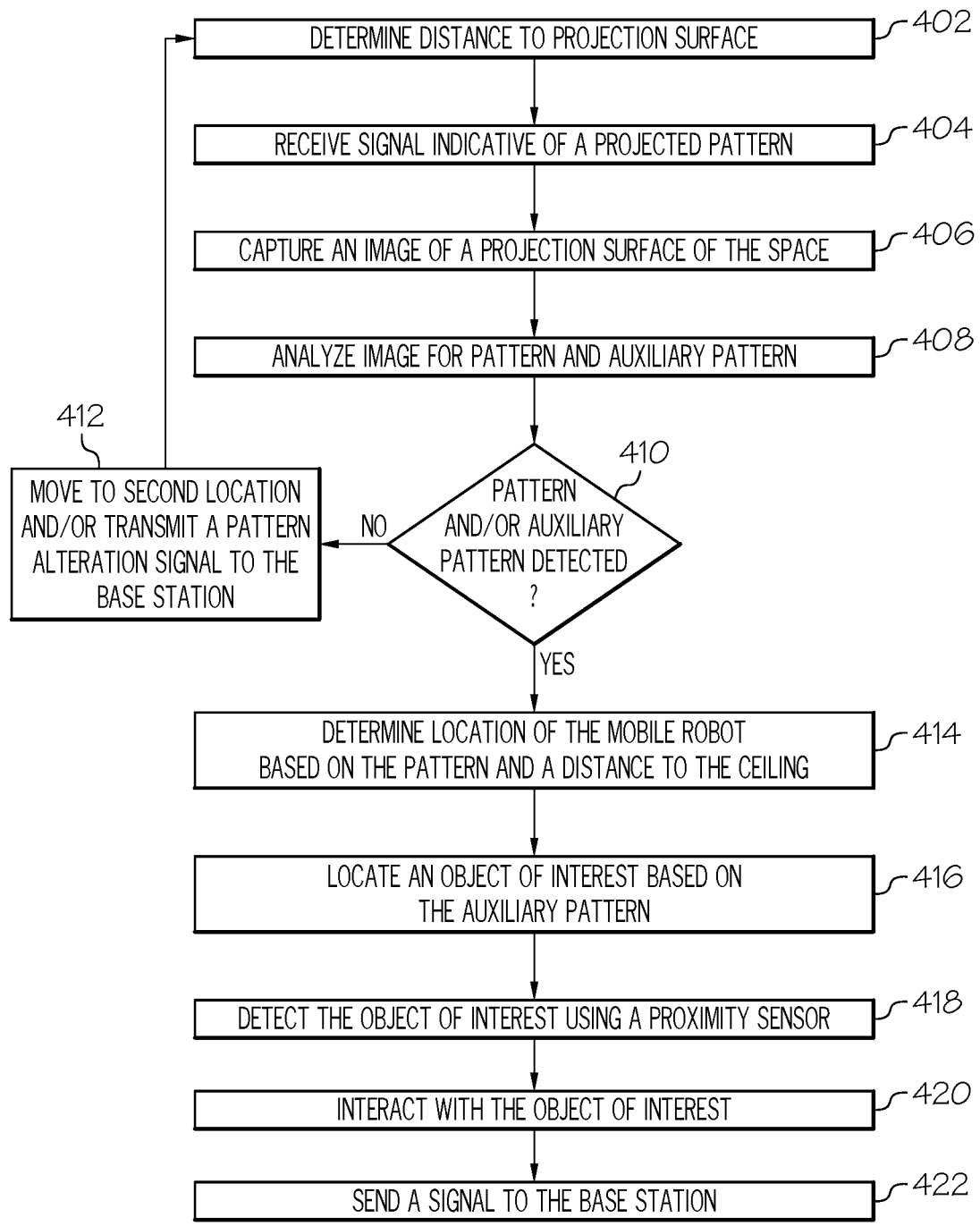
FIG. 4 depicts a flow diagram of an illustrative method of orienting and operating a robot, according to one or more embodiments shown and described herein.

FIG. 4 depicts a flow chart of an illustrative method of operating a robot, such as, for example, the robot 104 of FIGS. 1 and 2. The particular example embodiment described in FIG. 4 is not intended to limit the operation of the robot 104 to any particular order or number of steps and additional or alternative steps are contemplated. It is to be understood that one or more of the steps described below, although explicitly described with respect to the robot, could be performed by one or more of the base station and the auxiliary station in addition to or in place of the robot.

At block 402, the robot may determine a distance from the base station to the projection surface. This distance may be used to determine the detection angle of the pattern as detected by the robot (i.e., the detection angle). For example, the robot may receive a transmission containing a distance from the distance finder of the base station. The robot may use the distance to the projection surface to determine an expected pattern. For example, the robot may use the distance to determine the number of expected pixels in between dots in the imaged pattern and/or an expected arrangement of dots. In another example, the robot may use the distance to sort through a number of images stored in a memory of the robot taken from a number of different distances from the projection surface to find a representative image of the pattern from a given distance and compare a real-time image of the projection surface to the images of patterns taken from various distances. In another example, the robot may compare an expected shape of one or more objects with an imaged shape of one or more objects.

At block 404, the robot may receive a signal indicative of a projected pattern. For example, the base station may transmit a signal over a wireless connection to the robot, the signal indicating that the base station has projected a pattern. In some embodiments, the signal may include data about the projected pattern. For example, the robot may receive a signal from the base station that the pattern includes five dots. The robot may proceed to move throughout the environment until it detects a pattern having five dots (e.g., if one or more of the dots are occluded from detection and the robot can only detect four dots, it may continue to move until it detects five dots). It should be understood that the robot may not move according to block 404, such as in instances where the pattern can be imaged from the robot's current location.

At block 406, the robot may capture an image (i.e., visual data) of a projection surface of a space (e.g., the ceiling the robot's operating environment). The robot may use the imaging device (e.g., a camera) to capture the visual data. For example, the base station may project a pattern onto the projection surface of a room and the robot may capture visual data of the pattern with the imaging device.

At block 408, the robot may analyze the image of the projection surface for the pattern and the auxiliary pattern. The robot may perform one or more object or pattern recognition algorithms as described above in order to analyze the image. In some embodiments, the robot may receive a signal including data about the projected pattern from the base station in order to determine particular aspects of the pattern to compare the pattern to baseline patterns.

In some embodiments, the robot may be configured to recognize a projected pattern based on only detecting a portion of the pattern and to take one or more actions based on the recognized portion. For example, if the robot detects only half of the pattern projected by the base station, the robot may be configured to recognize that only a portion of the pattern is projected and the robot may move to a location where it can detect the entire pattern in order to orient itself within the environment. For example, the robot may compare an image to a bank of images in a non-transient processor readable storage medium and determine based on comparing captured image data to data stored in a memory that only a portion of the pattern is captured by the imaging device. In other embodiments, the robot may include a bank of partial images or partially occluded images to which it compares the captured image. The robot may compare the partial real-time image to the stored image to determine its location and determine where it needs to move to detect the entire image based on one or more of the orientation algorithms described above. In some embodiments, the robot may determine its location only by detecting the entire pattern. In some embodiments, the imaging device may transmit the visual data to the robot processor to process the data over the communication path. In some embodiments, the robot communications module may send the visual data to an external network, such as a cloud or edge network to process the data and the external processor may detect the pattern and send data back to the robot. Accordingly, the robot may be in communication with one or more of the base station, the auxiliary station, and an external network while it is in operation.

At block 410, the robot determines whether it detects the pattern and/or the auxiliary pattern using the object or pattern recognition software. As shown at block 412, in some embodiments, the robot may transmit a pattern-alteration signal to the base station if the robot does not detect a pattern which may cause the base station to project a different pattern or to move the projected pattern from one surface to another (e.g., if the projection is occluded) as described in greater detail herein. Additionally or alternatively, the robot may move to a second location based on not detecting the pattern and/or the auxiliary pattern.

If the pattern and/or the auxiliary pattern are detected, a location of the robot may be determined based on the pattern, the auxiliary pattern, and the distance to the ceiling at block 414. In some embodiments, the robot may calculate its location with respect to the base station based on the relative pose and geometry of the projected pattern as imaged by the robot. For example, the robot may determine its location with respect to the base station by measuring the distance between two features of the pattern (as determined by counting the number of pixels between the two features in the imaged data) and an angle from the robot to the pattern relative to a vertical or horizontal plane. Because the distance from the base station to the projection surface is known (i.e., using the distance finder), the distance between the projected pattern features is known, and the angle from the imaging device to the projected features is known, the position of the robot with respect to the base station can be determined.

For example, in one embodiment, the location of the robot may be determined with respect to the geographic position of at least two pattern features in a manner that is similar to celestial navigation. That is, the robot determines its position using angular measurements taken between at least two pattern features and a plane (e.g., horizontal plane or vertical plane) extending from the robot. The geographic position of a pattern feature is the location directly beneath each pattern feature on a floor of the space (e.g., a location of the base station when the base station projects the pattern directly above itself). The geographic position of each feature is known with respect to the base station because the position of each pattern feature is known with respect to the base station. The position of each pattern feature is known with respect to the base station because the angle relative to the floor of each feature and the angular position with respect to the base station can be set by the base station, as described herein.

The base station may direct at least two pattern features from the light emitter onto the projection surface, which can be detected by the imaging device of the robot. In certain embodiments, the pattern features are directed toward a ceiling. At least two of the pattern features may be transmitted with a known angle between the two pattern features with respect to the base station and at a given angle between the base station and a floor. In some embodiments, the angle between the features with respect to the base station can be set or changed by a user. By setting the angle between the features to a known value, the distance between the features at the projection surface can be determined, based on the distance between the base station and the projection surface. A flat projection surface is assumed for the purpose of this calculation, as is a flat floor that may be parallel to the projection surface.

As the robot moves within the space, it detects the pattern features emitted by the base station (e.g., a visual detection). The robot processor may convert the pattern features sensed by the imaging device into bearings from the robot to the features. The processor can then calculate representative angles and azimuths of the signals to determine the location of the robot within the space.

Accordingly, the robot may determine a distance to each geographic location based on the height of the projection surface (as measured by the distance finder) and the angle between the pattern feature and the point-of-view of the robot. The distance to the geographic location of an individual pattern feature is the distance of the projection surface multiplied by the tangent of the angle between the point-of-view of the robot and the pattern feature on the projection surface. By calculating the distance to at least two geographic locations of different pattern features, the robot can triangulate its position in the space with respect to the base station. The position of the robot may be continuously tracked with respect to the base station by continuously determining the location of the robot as described above. In embodiments in which the position of the base station is anchored or known with respect to the features in the room, the position of the robot with respect to the features of the room can also be determined, as described in greater detail herein.

In another embodiment, the robot may determine its location by comparing a captured image or scan of the pattern to a baseline image (e.g., an image that is stored in a hard drive of the robot) and measure the distance between the pattern features in the captured image versus the distance between pattern features in the baseline image. That is, the robot may include a bank of images that include reference data (e.g., images of a projected pattern that were taken from a known distance to the ceiling). In one illustrative embodiment, the robot may measure the distance (i.e., the number of pixels) between the features in the pattern in the stored image to determine a baseline distance at the reference distance associated with the reference image. The robot may compare the number of pixels between features of the pattern in the real-time image and the real-time distance to the ceiling to the number of pixels and distance in the reference image to determine the robot's location. In some embodiments, a match between the stored image and the real time image data may be compared to reference location values in a look up table stored in, for example, the storage device. If the robot does not detect a pattern or an auxiliary pattern, it may continue to search for the pattern or auxiliary pattern as shown at block 412 by moving to a second location and/or transmitting a pattern-alteration signal to the base station.

At block 416, the robot may use one or more of the methods described above to determine the location of the auxiliary station. Accordingly, the robot may locate the object of interest based on the location of the auxiliary station, since the auxiliary station is located at or near the object of interest as described herein. In some embodiments, the robot may move to the auxiliary station and determine the location of the object of interest using the proximity sensor, although this is not necessary. In some embodiments, the robot simply determines the location of the object of interest based on the auxiliary pattern. In some embodiments, the robot may continue to move within the room until it can detect the auxiliary pattern if the auxiliary station is projecting an auxiliary pattern and the robot does not detect the auxiliary pattern. However, it is contemplated that the auxiliary pattern may not be projected at all and that thus the robot may not detect an auxiliary pattern. In some embodiments, the auxiliary station is configured to transmit a signal to the robot when an auxiliary pattern is projected. For example, if a user of the system determines to place an auxiliary station near an object of interest in order for the robot to retrieve the auxiliary station, the user may place the auxiliary station near the object of interest and may direct the auxiliary station to project the signal. Accordingly, the auxiliary station may begin projecting the auxiliary pattern and generating a signal used by the robot to determine that an auxiliary pattern is projected (and thus, that an object of interest has been identified by a user), and the robot may locate the object of interest based on the auxiliary pattern.

At block 418, the robot may detect the object of interest using a proximity sensor. For example, the robot may determine the location of the auxiliary station using the projected pattern, but because the auxiliary station is generally placed near the object of interest by a user (i.e., not necessarily on top of the object of interest), the mobile robot may further determine the specific location of the object of interest with the proximity sensor. That is, the robot may approach the object of interest based on the signal from the auxiliary station, and once the robot is within a given radius (i.e., the detection radius of the proximity sensor); the robot may detect the object of interest via the proximity sensor. In some embodiments, the proximity sensor may include an RFID reader configured to read an RFID tag on the object of interest and/or the auxiliary station. For example, an RFID tag may be placed in or on the auxiliary station and/or the object of interest and may be configured to emit an RFID tag signal. The robot may then determine its proximity to the object of interest via the proximity sensor based on a reading of the RFID signal when it is within range of the emitted RFID tag signal (i.e., the signal may only emit to a particular distance). The robot may determine the location of the object of interest based on the emitted signal and the placement of the auxiliary station near the object of interest.

At block 420, the robot may interact with the object of interest. That is, the robot may pick up the object of interest and bring it to a user, the robot may pick around or clean around the object of interest (e.g., clean up a spilled drink, etc.), or interact with the object of interest in some other way. For example, the robot may push, pull, or collect the object of interest. In other embodiments, the robot may be configured with one or more cleaning implements (e.g., a vacuum, a broom, a dustpan, a rag, etc.) and may use such implements at the location of the object of interest. It is contemplated that in some embodiments, a user may interact with the auxiliary station to input one or more instructions for the robot through the auxiliary station. For example, the auxiliary station may include an array of discrete instructions to pass to the robot with the auxiliary pattern and/or the auxiliary station. For example, a user may select "retrieve the object of interest," or "clean in the vicinity of the object of interest," from an array of instructions and then place the auxiliary station near the object of interest. The robot may approach the object of interest and perform the directed action in the vicinity of the object of interest.

At block 422, the robot may transmit a signal to the base station based on interaction with the object of interest. For example, the robot may transmit a signal to the base station after it interacts with the object of interest, once it has recognized the pattern and oriented itself within the environment, and/or one or more other criteria. In such embodiments, the base station may cease to project the pattern once the robot has determined its location. The robot may communicate with the base station via a wireless connection. In other embodiments, the robot may send a signal to the base station that causes the base station to project the base pattern whenever the robot needs to update its location. The robot may send a signal to the base station based on having completed the directed action. For example, the robot may send a signal to the base station (e.g., auxiliary instructions sent via the auxiliary connection) that the robot has retrieved the object of interest. In embodiments, the signal indicating that the robot's task is complete is optional and not all robots will generate this signal. In some embodiments, the signal indicating that the task is complete is based on a user preference. For example, a user placing an auxiliary station near an object of interest may input one or more instructions via the auxiliary station that the robot should generate a signal that its particular task is complete when it has completed its task, thereby informing the base station, the auxiliary station, and potentially the user through the base/auxiliary stations that the task is complete.

Figure 5:
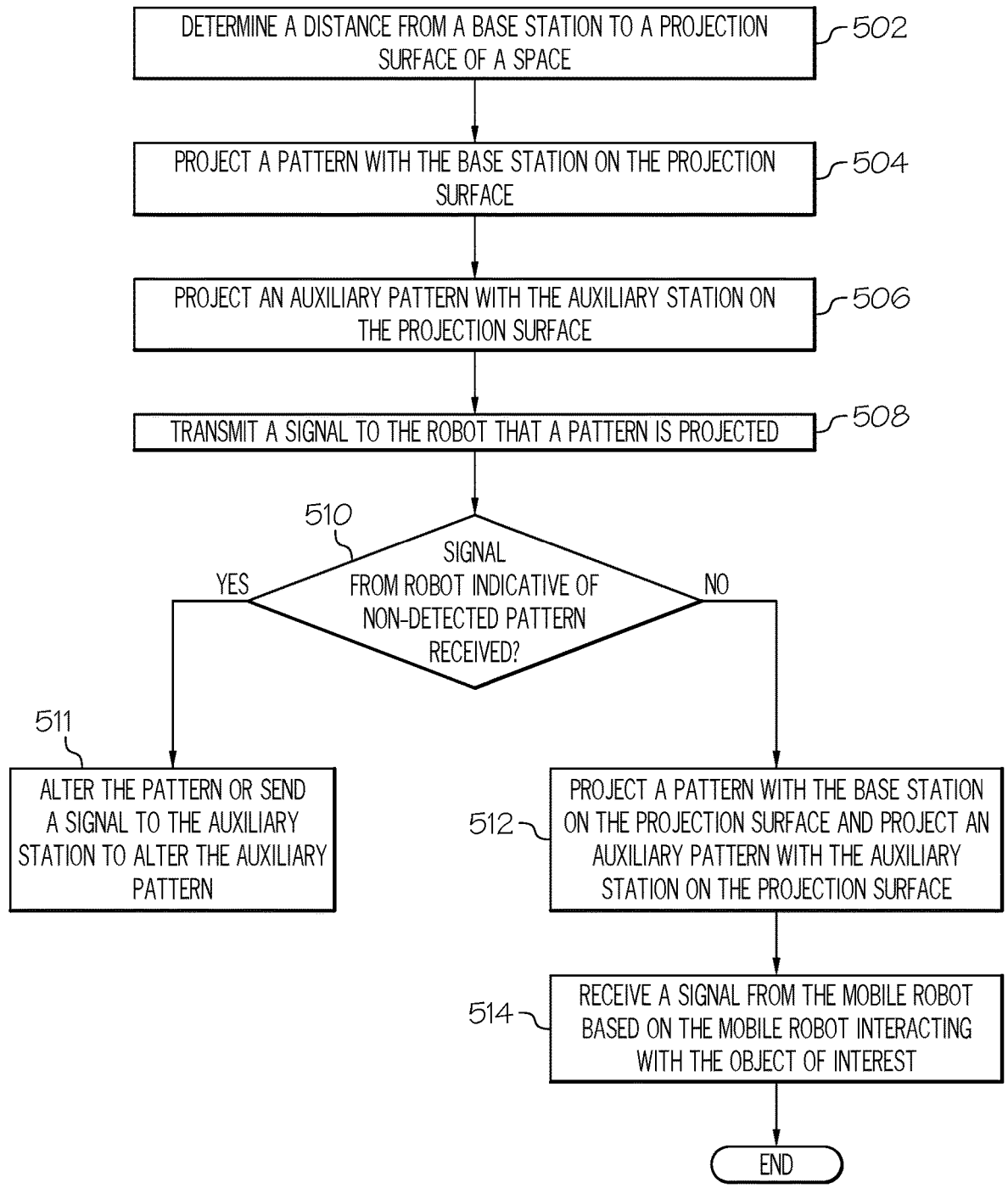
FIG. 5 depicts a flow diagram of an illustrative method of operating a base station, according to one or more embodiments shown and described herein.

Referring now to FIG. 5, an example embodiment of a method for operating the base station and the auxiliary station of FIGS. 1 and 3 will be described. The particular example embodiment described in FIG. 5 is not intended to limit the operation of the base station and/or the auxiliary station to any particular order or number of steps and additional or alternative steps are contemplated.

At block 502, the distance from one or more of the base station and the auxiliary station to the projection surface is determined. In some embodiments, the distance to the projection surface is determined using a distance finder. For example, the base station may determine a distance to the projection surface using a laser distance finder. One or more of the base station, the robot, and the auxiliary station may use the distance to the projection surface to determine an expected pattern or to determine a location of the robot based on the distance to the projection surface. In some embodiments, the base station determines the distance to the projection surface and this distance is used as the distance from the auxiliary station to the projection surface (e.g., if the projection surface and the ground are presumed to be parallel planes and the base station and the auxiliary station are both in between the parallel planes). In some embodiments, the distance is used to determine an orientation of a robot interacting within the space in which the base station is located as is described in greater detail herein. In some embodiments, the distance to the projection surface may be transmitted to the robot, for example, in embodiments in which the determination of the location of the robot with respect to the base station is determined by the robot.

At block 504, the base station may project a pattern to the projection surface. The pattern projected may be based upon the number and type of robots communicatively coupled with the base station. For example, if a robot in the vicinity of the base station has the capability to detect and process information associated with an infrared pattern, the base station may project an infrared pattern. As another example, if a robot in the vicinity of the base station has the capability to detect a pattern over a wide portion of the projection surface (e.g., using a wide-angle lens) the base station may project a pattern over a wide portion of the projection surface. In some embodiments, the base station may project several patterns for a single robot. In other embodiments, the base station may project one pattern for several robots. In some embodiments, the base station may be configured to project the base pattern only when the robot needs to orient itself in the environment (e.g., a user has instructed the robot to interact with an object of interest). The pattern may be projected using any light source including infrared light sources. In some embodiments, the base station may be configured to move the projected pattern and to project the pattern such that the entire projected pattern is shown on the projection surface. For example, the base station may receive an image of the projection surface from the robot and adjust the projected pattern if one or more portions of the pattern are occluded by objects in the environment (e.g., a couch). In some embodiments, the base station may project the pattern to a predetermined size based on the distance to the ceiling. That is, the base station may project the pattern such that it is always a given size so that the robot reading the pattern knows exactly what size pattern to search for. The robot may then determine its location within the room based on the orientation of the pattern and the distance to the projection surface, as described above.

At block 506, the auxiliary station may project the auxiliary pattern onto the projection surface. The pattern may include one or more lights or infrared markings. The pattern may be projected using any light source, including infrared light sources. In some embodiments, the auxiliary station may be configured to move the auxiliary pattern and to project the pattern such that the entire auxiliary pattern is shown on the projection surface. For example, the auxiliary station may receive an image of the projection surface from the robot and adjust the projected pattern if one or more portions of the auxiliary pattern are occluded by objects in the environment (e.g., a couch).

At block 508, the base station and/or the auxiliary station may transmit a signal to the robot that a pattern and/or the auxiliary pattern has been projected by one or more of the base station and the auxiliary station. This signal may trigger the robot to begin searching for the pattern and/or the auxiliary pattern. The signal may be transmitted, for example, by the network interface hardware communicatively coupled to the ECU of the base station.

At block 510, the base station may determine whether a signal from the robot indicative of a non-detected pattern (i.e., the pattern-alteration signal discussed herein) has been received. If such a signal has been received, the base station may alter the pattern or send a signal to the auxiliary station to alter the auxiliary pattern at block 511. In some embodiments, the pattern and/or the auxiliary pattern may change shape, size, location, or some other feature of the pattern. For example, the pattern may change such that the pattern is projected in a different location on the projection surface. If such a signal is not received, the base station may continue to project the pattern at block 512. As described above with respect to block 504 and 506, the base station and/or the auxiliary station may continue to project the pattern and/or the auxiliary pattern.

At block 514, the base station may receive a signal from the robot based on the robot interacting with the object of interest. For example, the base station may receive a signal that the robot has retrieved an object of interest. At block 514, the base station may alter the pattern or send a signal to the auxiliary station to alter the auxiliary pattern based on receiving a signal from the robot that one or more tasks associated with the object of interest have been completed. The base station may change the number, pattern, or type of the projected pattern in response to receiving the signal from the robot. In some embodiments, the base station may change the area on the projection surface where the pattern is projected. Similar changes may be made with respect to the auxiliary pattern. For example, the base station may project a first pattern while a robot is performing a particular task (e.g., moving from one location to another and retrieving an object of interest in the vicinity of a first auxiliary station). Once the robot has completed this first task, the robot may send a signal to the base station (as described above), and the base station may change the projected pattern. For example, the robot may have a second task associated with a second auxiliary station that is in an area where the projected pattern would be occluded from the robot's image if the base did not change the projected pattern. Accordingly, the base station can move or change the projected pattern such that the robot can detect the projected pattern the entire time it is moving from the first auxiliary station to the second auxiliary station and carrying out the second task such that there is no break in continuity between the robot and the second projected pattern while the robot is carrying out the second task.

It should now be understood that the systems and methods described herein include a robot, a base station, and one or more auxiliary stations that are placed within a space to allow the robot to determine its location. The base station may include a distance finder for determining a distance from the base station to a projection surface (e.g., a ceiling) and a base light emitter. The base light emitter projects a pattern (e.g., lasers) onto the projection surface. The robot includes a moveable base and an imaging device (e.g., a camera). The imaging device faces a projection surface and detects the pattern on the projection surface to orient and orient the robot within the operating area. The auxiliary station includes an auxiliary emitter. The auxiliary emitter projects an auxiliary pattern onto the projection surface, which the robot reads to determine a location of an object of interest. The robot may approach and interact with the object of interest based on instructions relayed to the robot.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An orientation system comprising:
   a base station comprising a light emitter that projects a pattern onto a projection surface of a space;
   an auxiliary station comprising an auxiliary emitter that projects an auxiliary pattern onto the projection surface;
   a robot comprising a moveable base supporting an imaging device; and wherein the robot:
   captures, with the imaging device, at least one image of the projection surface,
   detects the pattern and the auxiliary pattern in the at least one image, and
   determines a location of the robot and a distance to the projection surface within the space based on the pattern.

2. The orientation system of claim 1, wherein the robot determines a location of the auxiliary station based on the auxiliary pattern.

3. The orientation system of claim 2, wherein the robot further comprises a non-transitory, processor-readable storage medium storing an instruction set and a processor, the instruction set, when executed by the processor, causing the robot to move to the auxiliary station.

4. The orientation system of claim 1, wherein one or more of the pattern and the auxiliary pattern comprise an augmented reality (AR) code.

5. The orientation system of claim 1, wherein the base station further comprises a distance finder for determining a distance from the base station to the projection surface of a room.

6. The orientation system of claim 5, wherein the base station calibrates the pattern to a predetermined size based on the distance between the base station and the projection surface.

7. The orientation system of claim 5, wherein the robot determines the location of the robot within the space based on a size of the pattern.

8. The orientation system of claim 1, wherein the base station sends one or more auxiliary instructions to the robot over a wireless connection between the robot and the base station.

9. The orientation system of claim 8, wherein the auxiliary instructions indicate the location of an object of interest to the robot.

10. A robot comprising:
an imaging device and a control unit comprising a processor and a non-transitory, processor-readable storage medium storing a processor-readable instruction set, wherein the processor-readable instruction set, when executed, causes the robot to:
capture an image of a projection surface of a space;
detect a pattern and an auxiliary pattern in the image;
determine a location of the robot based on the pattern and a distance to the projection surface.

11. The robot of claim 10, wherein the processor-readable instruction set further causes the robot to locate an object of interest based on the auxiliary pattern.

12. The robot of claim 11, wherein the robot retrieves the object of interest.

13. The robot of claim 10, further comprising a robot communications module capable of forming an auxiliary connection with a base station, wherein the robot receives instructions to retrieve an object of interest via the auxiliary connection.

14. The robot of claim 13, wherein the robot retrieves the object of interest and sends a signal to the base station based on retrieving the object of interest.

15. The robot of claim 10, further comprising a proximity sensor, wherein the robot detects an object of interest based on a signal generated by the proximity sensor.

16. The robot of claim 10, wherein the robot generates a pattern-alteration signal and sends the pattern-alteration signal to one or more of a base station and an auxiliary station that causes one or more of the base station and the auxiliary station to change the pattern and the auxiliary pattern.

17. The robot of claim 10, wherein the processor-readable instruction set, when executed, causes the robot to detect an augmented reality (AR) code.

18. A method of determining a location of a robot within a space including a projection surface with respect to a pattern and an auxiliary pattern, the method comprising:
determining a distance from a base station to the projection surface of the space;
projecting the pattern with the base station on the projection surface;
projecting the auxiliary pattern with an auxiliary station on the projection surface;
detecting the pattern with an imaging device positioned on the robot;
determining a location of the robot based on an image of the pattern and the distance;
detecting the auxiliary pattern with the imaging device; and
determining a location of an object of interest based on the auxiliary pattern and the distance.

19. The method of claim 18, further comprising moving the robot to the object of interest and retrieving the object of interest with the robot.

20. The method of claim 19, further comprising sending a signal from the robot to the base station based on retrieving the object of interest.

* * * * *